(12) United States Patent
Hassan et al.

(10) Patent No.: US 8,249,078 B1
(45) Date of Patent: Aug. 21, 2012

(54) PREDICTION AND USE OF CALL SETUP SIGNALING LATENCY FOR ADVANCED WAKEUP AND NOTIFICATION

(75) Inventors: Kafi Hassan, Fairfax, VA (US); Ramesh Kalathur, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 334 days.

(21) Appl. No.: 12/619,391

(22) Filed: Nov. 16, 2009

(51) Int. Cl.
H04L 12/28 (2006.01)

(52) U.S. Cl. .................. 370/395.21; 455/519; 455/518; 455/456.1; 455/456.3; 370/238

(58) Field of Classification Search .............. 455/41.2, 455/519, 518, 515, 456.1, 456.2, 456.3, 574, 455/450; 370/238, 351, 352, 395.21, 508, 370/517, 519
See application file for complete search history.

(56) References Cited

U.S. PATENT DOCUMENTS

| | | | |
|---|---|---|---|
| 4,870,408 A | | 9/1989 | Zdunek et al. |
| 5,442,809 A | | 8/1995 | Diaz et al. |
| 5,568,511 A | | 10/1996 | Lampe |
| 5,705,980 A | * | 1/1998 | Shapiro .................... 340/539.11 |
| 5,710,591 A | | 1/1998 | Bruno et al. |
| 5,752,202 A | | 5/1998 | Obright |
| 5,818,836 A | | 10/1998 | DuVal |
| 5,850,611 A | | 12/1998 | Krebs |
| 5,884,196 A | | 3/1999 | Lekven et al. |
| 5,936,964 A | | 8/1999 | Valko et al. |
| 5,983,099 A | | 11/1999 | Yao et al. |
| 6,014,556 A | | 1/2000 | Bhatia et al. |
| 6,016,424 A | | 1/2000 | Hicks et al. |
| 6,032,051 A | | 2/2000 | Hall et al. |
| 6,041,241 A | | 3/2000 | Willey |
| 6,119,017 A | | 9/2000 | Cassidy et al. |
| 6,178,323 B1 | | 1/2001 | Nagata |
| 6,289,054 B1 | | 9/2001 | Rhee |
| 6,292,671 B1 | | 9/2001 | Mansour |
| 6,317,595 B1 | | 11/2001 | St. John et al. |

(Continued)

FOREIGN PATENT DOCUMENTS

EP 0 817 457 A2 1/1998

(Continued)

OTHER PUBLICATIONS

International Search Report from International Application No. PCT/US02/31411, dated Mar. 4, 2003.

(Continued)

*Primary Examiner* — Kamran Afshar
*Assistant Examiner* — Dung Lam

(57) ABSTRACT

A method and system to help reduce the impact of inter-node latency in session setup. In accordance with the method, a computer will predict a measure of call setup signaling latency for each of a number of wireless communication devices based on actual latency data for the coverage areas in which the devices are positioned, and the computer will then use the predicted latency measures as a basis to select one or more of the devices to wake up in advance of session initiation. The computer will then send at least one message that triggers wakeup of the selected device(s), so as to help reduce latency in subsequent initiation of a session with the selected device(s). Further, the computer may provide notification to a given device of the predicted latencies determined for other devices, to facilitate presentation of the latency information to a user.

16 Claims, 3 Drawing Sheets

U.S. PATENT DOCUMENTS

| | | | |
|---|---|---|---|
| 6,381,467 | B1 | 4/2002 | Hill et al. |
| 6,477,150 | B1 | 11/2002 | Maggenti et al. |
| 6,490,452 | B1 | 12/2002 | Boscovic et al. |
| 6,526,377 | B1 | 2/2003 | Bubb |
| 6,564,049 | B1 | 5/2003 | Dailey |
| 6,590,885 | B1 | 7/2003 | Jorgensen |
| 6,606,502 | B1 | 8/2003 | Chung Kam Chung et al. |
| 6,668,167 | B2 | 12/2003 | McDowell et al. |
| 6,757,245 | B1 | 6/2004 | Kuusinen et al. |
| 6,865,398 | B2 | 3/2005 | Mangal et al. |
| 7,020,098 | B2 | 3/2006 | Ehrsam et al. |
| 7,043,266 | B2 | 5/2006 | Chaturvedi et al. |
| 7,099,291 | B2 | 8/2006 | Harris et al. |
| 7,099,629 | B1 | 8/2006 | Bender |
| 7,151,753 | B2 | 12/2006 | Chaney et al. |
| 7,154,864 | B2 | 12/2006 | Costa-Requena et al. |
| 7,263,095 | B1 * | 8/2007 | Sarkar ............................ 370/352 |
| 7,292,825 | B2 | 11/2007 | Beale et al. |
| 7,444,139 | B1 | 10/2008 | Welch et al. |
| 7,529,558 | B1 * | 5/2009 | Blair et al. .................... 455/519 |
| 2002/0034166 | A1 | 3/2002 | Barany et al. |
| 2002/0034941 | A1 | 3/2002 | Ptil et al. |
| 2002/0055364 | A1 | 5/2002 | Wang et al. |
| 2002/0058523 | A1 | 5/2002 | Maggenti et al. |
| 2002/0071445 | A1 | 6/2002 | Wu et al. |
| 2002/0114322 | A1 | 8/2002 | Xu et al. |
| 2002/0145990 | A1 | 10/2002 | Sayeedi |
| 2002/0147818 | A1 | 10/2002 | Wengrovitz |
| 2002/0172165 | A1 | 11/2002 | Rosen et al. |
| 2002/0172169 | A1 | 11/2002 | Rosen et al. |
| 2002/0173308 | A1 | 11/2002 | Dorenbosch et al. |
| 2002/0173325 | A1 | 11/2002 | Rosen et al. |
| 2002/0173326 | A1 | 11/2002 | Rosen et al. |
| 2002/0173327 | A1 | 11/2002 | Rosen et al. |
| 2002/0177461 | A1 | 11/2002 | Rosen et al. |
| 2002/0184391 | A1 * | 12/2002 | Phillips ......................... 709/248 |
| 2002/0191583 | A1 | 12/2002 | Harris et al. |
| 2002/0198008 | A1 | 12/2002 | Smith et al. |
| 2003/0008657 | A1 | 1/2003 | Rosen et al. |
| 2003/0021264 | A1 | 1/2003 | Zhakov et al. |
| 2003/0032448 | A1 | 2/2003 | Bulthuis et al. |
| 2003/0083045 | A1 | 5/2003 | Blight et al. |
| 2003/0097447 | A1 | 5/2003 | Johnston |
| 2003/0100326 | A1 | 5/2003 | Grube et al. |
| 2003/0114156 | A1 | 6/2003 | Kinnavy |
| 2003/0114174 | A1 | 6/2003 | Walsh et al. |
| 2003/0119540 | A1 | 6/2003 | Mathis |
| 2003/0125062 | A1 | 7/2003 | Bethards et al. |
| 2003/0186702 | A1 | 10/2003 | McConnell et al. |
| 2004/0006623 | A1 | 1/2004 | Gourraud et al. |
| 2004/0009761 | A1 | 1/2004 | Money et al. |
| 2004/0014456 | A1 | 1/2004 | Vaananen |
| 2004/0032843 | A1 | 2/2004 | Schaefer et al. |
| 2004/0082352 | A1 | 4/2004 | Keating et al. |
| 2004/0105436 | A1 | 6/2004 | Ament |
| 2004/0121791 | A1 | 6/2004 | May et al. |
| 2004/0127176 | A1 | 7/2004 | Rozhavsky et al. |
| 2004/0151158 | A1 | 8/2004 | Gannage et al. |
| 2004/0192363 | A1 | 9/2004 | Rosetti et al. |
| 2005/0096059 | A1 | 5/2005 | Jiang et al. |
| 2005/0239485 | A1 | 10/2005 | Kundu et al. |
| 2007/0211702 | A1 * | 9/2007 | Doradla et al. ............... 370/356 |
| 2007/0275697 | A1 | 11/2007 | Aminzadeh |
| 2008/0031224 | A1 | 2/2008 | Nanda et al. |

FOREIGN PATENT DOCUMENTS

| | | |
|---|---|---|
| EP | 0 984 608 A2 | 6/1999 |

OTHER PUBLICATIONS

International Search Report from International Application No. PCT/US02/29575, dated Dec. 10, 2002.
International Search Report from International Application No. PCT/US02/36055, dated Apr. 10, 2003.
International Search Report from International Application No. PCT/US03/03021, dated Jun. 18, 2003.
International Search Report from International Application No. PCT/US03/02950, dated Nov. 6, 2003.
U.S. Appl. No. 10/277,465, filed Oct. 22, 2002 entitled "Method for Call Setup Using Short Data Bursts".
3rd Generation Partnership Project 2 "3GPP2", Fast Call Set-Up, Version 1.0, Apr. 15, 2002.
Mobile Tornado, http://www.mobiletornado.com/products_iprsptt.html, printed from the World Wide Web on Jan. 27, 2003.
"Qualcomm Chats Up 'Push-to-Talk'," http://siliconvalley.internet.com/news/print.php/953261, printed from the World Wide Web on Jan. 27, 2003.
Schulzrinne and Rosenberg, "SIP Caller Preferences and Callee Capabilities," Internet Engineering Task Force, Internet Draft, Oct. 22, 1999.
Vakil et al., "Host Mobility Management Protocol Extending SIP to 3G-IP Networks," Internet Engineering Task Force, Internet Draft, Oct. 1999.
Campbell and Sparks, "Control of Service Context Using SIP Request—URI," Network Working Group, Apr. 2001.
Ericsson, www.telecomcorridor.com/wireless%20horizons/1Coyne.pdf, printed from the World Wide Web on Jun. 27, 2001.
Dirk Kutscher/Jorg Ott, "The Message Bus—A Communication & Integration Infrastructure for Component-Based Systems," White Paper, Jan. 2000.
Ott et al., "A Message Bus for Local Coordination," Network Working Group, Internet-Draft, May 30, 2001.
TR45, Medium Access Control (MAC) Standard for cdma2000 Spread Spectrum System, IS-2000-3, Jul. 12, 1999.
3rd Generation Partnership Project 2 '3GPP2', "Interoperability Specification (IOS) for CDMA 2000 Access Network Interfaces—Part 3 Features," Nov. 2001.
Perkins, "IP Mobility Support," Internet Engineering Task Force Request for Comment 2002, Oct. 1996.
Perkins, "IP Encapsulation within IP," Internet Engineering Task force Request for Comments 2003, Oct. 1996.
Perkins, "Minimal Encapsulation with in IP," Internet Engineering Task Force Request for Comments 2004, Oct. 1996.
Solomon, "Applicability Statement for IP Mobility Support," Internet Engineering Task Force Request for Comments 2005, Oct. 1996.
Handley et al., "SDP: Session Description Protocol," Internet Engineering Task Force Request for Comment 2327, Apr. 1998.
Handley et al., "SIP: Session Initiation Protocol," Internet Engineering Task Force Request for Comment 2543, Mar. 1999.
Fielding et al., "Hypertext Transfer Protocol—HTTP/1.1," Internet Engineering Task force Request for Comment 2616, Jun. 1999.
Rigney et al., "Remote Authentication Dial in User Service (RADIUS)," Internet Engineering Task Force Request for Comment 2865, Jun. 2000.
Rigney, "RADIUS Accounting," Internet Engineering Task Force Request for Comment 2866, Jun. 2000.
OMA, Discussion and definitions on PoC Floor Control, Input Contribution, Doc #OMA-REQ-2003-0375-PoC_Floor_Control, Jun. 2, 2003.
OMA, "PoC Use case: Mobile—PC Example," Input Contribution, Doc #OMA-REQ-2003-0323 PoC Mobile-PC use case, May 5, 2003.
OMA, "PoC Use case: Multimedia Group Call Example," Input Contribution, Doc #OMA-REQ-2003-0306-PoC UseCase-group-multimedia-scenario, May 6, 2003.
OMA, "PoC Use case: Examples of User Requirements," Input Contribution, Doc #OMA-REQ-2003-0305-PoC Use Case, May 6, 2003.
OMA, "Inputs for PoC Requirements Document," Input Contribution, Doc #OMA-REQ-2003-0367-PoC_Input_Motorola, May 29, 2003.
OMA, "Push to Talk over Cellular (PoC)," Version: 0.1.6, May 12, 2003.
Office Action from U.S. Appl. No. 10/067,080, dated May 21, 2003.
Office Action from U.S. Appl. No. 10/067,080, dated Apr. 27, 2004.
U.S. Appl. No. 10/356,310, filed Jan. 30, 2003.
Office Action from U.S. Appl. No. 10/356,310, dated Jan. 9, 2007.
Office Action from U.S. Appl. No. 10/356,310, dated May 21, 2007.
Office Action from U.S. Appl. No. 10/356,310, dated Aug. 6, 1007.
Office Action from U.S. Appl. No. 10/356,310, dated Jun. 17, 2008.
Office Action from U.S. Appl. No. 10/356,310, dated Dec. 22, 2008.
Office Action from U.S. Appl. No. 12/201,665, dated Mar. 19, 2009.

Office Action from U.S. Appl. No. 12/201,665, dated Sep. 1, 2009.
U.S. Appl. No. 10/781,609, filed Feb. 18, 2004.
Bill Douskalis, "IP Telephone—The Integration of Robutst VoIP Services," Section 1.3, pp. 36-69, Prentice Hall PTR, 2000.

Qualcomm, "Dispatch Services on cdma2000," May 11, 2001.

* cited by examiner

PREDICTION AND USE OF CALL SETUP SIGNALING LATENCY FOR ADVANCED WAKEUP AND NOTIFICATION

BACKGROUND

A typical cellular wireless communication system provides numerous wireless coverage areas in which served wireless communication devices (WCDs) can operate. Each wireless coverage area may be defined by radio frequency radiation from a respective cellular base station, and each base station, together with additional network infrastructure, may provide connectivity with one or more transport networks such as the public switched telephone network (PSTN) and the Internet. With this arrangement, a WCD that is positioned within a given wireless coverage area may be served by the base station defining that coverage area and may thereby engage in communication, via that base station and perhaps additional network infrastructure, with one or more other WCDs, network servers, and other entities.

Aside from possibly allowing WCDs to thereby engage in conventional wireless telephone calls with each other, modern cellular wireless systems also enable WCDs to engage in real-time packet-based communication, such as voice-over-IP (VoIP) communication, with each other. To engage in such communication, each WCD may acquire a wireless packet data connection with its serving base station, and the WCDs may then engage in packet-based session setup signaling to set up a session.

A packet-based real-time media session between two WCDs can be set up and conducted in a peer-to-peer manner, where the WCDs exchange session setup signaling with each other to agree on session parameters, and the WCDs then exchange packet-based media (e.g., VoIP) with each other. Alternatively, a packet-based real-time media session between two or more WCDs can be set up and conducted via a call server that effectively functions as a bridge between the WCDs. In either case, the signaling used to set up the session may be packet-based signaling in accordance with the well known Session Initiation Protocol (SIP) for instance, and the WCDs may exchange packet-based real-time media with each other in accordance with a protocol such as the well known Real-time Transport Protocol (RTP) for instance.

In a server based arrangement, for example, a given WCD may initiate a session with one or more other WCDs by sending a SIP "INVITE" message via the WCD's base station and other network infrastructure to a call server situated on a packet-switched network. The INVITE message may designate the target WCDs individually or by a group ID number that the call server can correlate with the target WCDs, or the INVITE message may not identify any target, in which case the call server may perform a database lookup to identify one or more WCDs that are preset as "buddies" of the initiating WCD and thus should be treated as target(s) for the requested session.

Upon receipt of the INVITE from the initiating WCD, the call server may then itself send an INVITE to each target WCD. In turn, upon receipt of the INVITE, each target WCD may respond to the call server with a SIP "OK" message signaling acceptance of the invitation from the call server, and the call server may likewise respond to the initiating WCD with an OK signaling acceptance of the invitation from the initiating WCD. After perhaps additional signaling, such as exchange of SIP "ACK" messages, an RTP leg would be established (i) between the initiating WCD and the call server and (ii) between the call server and each target WCD. The call server may then bridge those RTP legs together in order to allow the WCDs to communicate with each other.

This type of process can be used to set up VoIP conference calls or other type of packet-based real time media sessions (e.g., video calls, etc.) between WCDs. Further, the process can be used to facilitate "instant connect" communication, such as push-to-talk (PTT), push-to-view (PTV) or similar communications, generally referred to as Push-to-X over cellular or PoC communications.

OVERVIEW

One problem that can arise in setup of a communication session/call between WCDs is that there can be substantial delay or "latency" in the process. With traditional cellular telephone calls, this is usually not an issue, as people are accustomed to waiting for a call to ring before the called party answers. But with real-time packet-based media sessions such as PoC sessions for instance, latency can be more of an issue.

There are at least two sources of potential latency in setting up a communication session between WCDs: (1) the time it takes for setup signaling to pass between nodes in the network, such as between a call server and each WCD, and (2) the time it takes to "wake up" a WCD that does not yet have an active wireless packet-data connection through which it can engage in packet-based session setup signaling.

In terms of inter-node latency, for example, it will take a certain amount of time for session setup signaling, such as SIP INVITE messaging, to pass from an initiating WCD to a call server, and from the call server to each of the WCDs being invited to the session. This amount of time may vary depending on the distance between the call server and each WCD, and based on other factors such as the number of nodes and types of equipment through which the signaling passes along the way.

In terms of wakeup latency, it is common practice for a WCD that has acquired wireless packet-data connectivity to enter a "dormant" mode after a threshold period of inactivity. In particular, if no packet-data flows to or from the WCD for a threshold period of time, the radio network serving the WCD may transition the WCD to a dormant mode by releasing air interface resources that were assigned for use by the WCD. In the dormant mode, the WCD has no radio link through which to engage in packet-data communications, but the WCD may still have an assigned network address (e.g., IP address) for packet-data communications. Thus, in that state, if the radio network then receives packet-data such as a SIP INVITE destined to the network address of WCD, the network may need to page the WCD over an air interface paging channel and await a response from the WCD, after which the network may then transition the WCD to an "active" state by re-assigning a radio link to the WCD and then transmit the received packet-data to the WCD. Overall, this process of holding packet-data until a WCD transitions from the dormant mode to the active mode can be a significant source of session setup latency.

Disclosed herein is a method and corresponding system to help reduce the impact of inter-node latency in session setup. In accordance with the method, a computer will predict a measure of call setup signaling latency for each of a number of WCD's based on actual latency data for the coverage areas in which the WCDs are positioned (e.g., last registered), and the computer will then use the predicted latency measures as a basis to select one or more of the WCDs to wake up. The computer will then send at least one message that triggers wakeup of the selected WCD(s).

This method can be used advantageously to wake up of one or more of a WCD's buddies before the WCD even seeks to initiate a session with the buddies, to thereby help minimize setup duration when the WCD thereafter actually seeks to initiate a session with the buddies.

For instance, if we assume that a WCD has buddies A, B, and C (each a respective other WCD), the computer may determine that buddy A is in a high latency coverage area but buddies B and C are not. In that scenario, if the WCD were to attempt session initiation with all three buddies at once, the WCD may send an INVITE to the call server and the call server may send an INVITE respectively to each buddy device. But the higher latency in buddy A's coverage area may delay receipt of the INVITE by buddy A and may thus slow down setup of the session overall (at least with respect to buddy A), even though buddies B and C may receive their respective INVITEs without much delay.

Applying the method in this scenario, at some point before the WCD seeks initiation of a given session with the buddies (e.g., before the WCD sends an INVITE to the call server to trigger session initiation), the computer may identify the coverage areas in which the WCD's buddies are positioned and may predict a measure of call setup signaling latency for each buddy based on latency data associated with the buddy's coverage area. The computer may then use the measures of predicted call setup signaling latency of the various buddies as a basis to select one or more of the buddies to wake up. For instance, the computer may select a buddy to wake up if the predicted latency for that buddy exceeds a defined threshold. Or the computer may rank the predicted latencies for the various buddies and may select one or more top ranked buddies (in accordance with the ranking) to wake up. The computer may then send one or more messages to trigger advanced wakeup of the selected buddies. For instance, the computer may send a PING message or other packet-data communication to each selected buddy, which should cause the network to wake up the buddy if the buddy is currently dormant.

This method may help to mitigate an increase in call setup signaling latency for a buddy that is positioned in coverage area having high associated latency. In particular, although the inter-node latency for such a buddy would tend to increase call setup latency, eliminating the wakeup latency for the buddy by waking up the buddy in advance may help to offset that inter-node latency increase. As a result, the overall latency for that buddy may pose less of an issue, particularly compared with other buddies who are not in high-latency coverage areas.

In practice, the present method should prove most beneficial when the buddy device that the computer opts to wake up in advance is currently dormant. To provide that focus, the computer can further be arranged to limit its selection to just devices that are currently dormant. For instance, once the computer identifies the buddies at issue, the computer may determine the coverage areas of each buddy, and the computer may then query an RNC or other entity in control of each coverage area to determine whether the buddy is currently dormant. The computer may then predict for each dormant buddy a measure of call setup signaling latency based on the coverage area in which the buddy is located, the computer may use the predicted measures of call setup latency as a basis to select one or more of the dormant buddies to wake up, and the computer may send one or more messages to trigger wakeup of the one or more selected buddies.

On the other hand, the method can also be more simply applied without limitation to dormant buddies. In that case if it turns out that a buddy selected to be awakened is already active, the act of sending a message to trigger wakeup of the buddy would likely be harmless. Yet the act of sending, such a message to trigger wakeup of a buddy that is currently dormant would beneficially result in waking up the buddy. Thus, the method steps of selecting a device to "wake up" and then sending a message to trigger "wakeup" of the device should be considered applicable even if it turns out that the target device is already active (i.e., already awake).

These as well as other aspects, advantages, and alternatives will become apparent to those of ordinary skill in the art by reading the following detailed description, with reference where appropriate to the accompanying drawings. Further, it should be understood that this overview and the other description provided throughout this document is provided to explain the invention by way of example and is not intended to be limiting.

DETAILED DESCRIPTION

Figure 1:
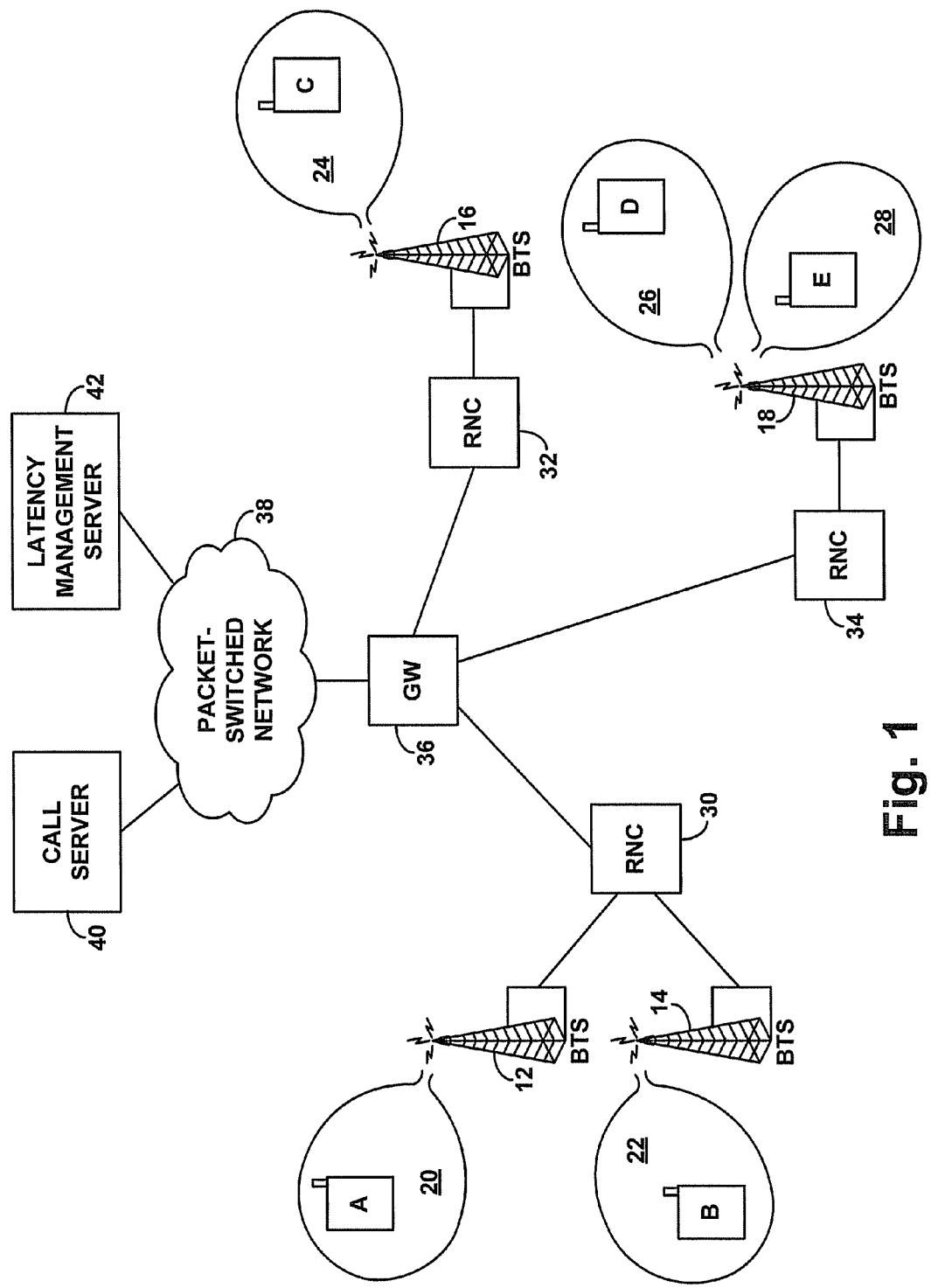
FIG. 1 is a simplified block diagram of an example network in which an exemplary embodiment of the present method can be implemented.

Referring to the drawings, as noted above, FIG. 1 is a simplified block diagram of an example network in which the present method can be implemented. The example network is shown including a number of base transceivers stations (BTSs) 12, 14, 16, 18 each of which radiates to define one or more respective wireless coverage areas in which WCDs can operate, and the figure depicts a representative WCD operating in each coverage area. In particular, the figure depicts BTS 12 radiating to define a coverage area 20 in which WCD "A" is operating, BTS 14 radiating to define a wireless coverage area 22 in which WCD "B" is operating, BTS 16 radiating to define a wireless coverage area 24 in which WCD "C" is operating, and BTS 18 radiating to define wireless coverage area 26 in which WCD "D" is operating and wireless coverage area 28 in which wireless coverage area "E" is operating.

Each BTS is shown by way of example being coupled with a radio network controller (RNC), which may function to control aspects of BTS and air interface operation and thus generally to serve the BTS and its respective coverage area(s). Three example RNCs are shown, RNC 30 serving BTS 12 and BTS 14, RNC 32 serving BTS 16, and RNC 34 serving BTS 18. In turn, the three example RNCs are shown coupled with a gateway 36, such as a packet data serving node or other network access server, which provides connectivity with a packet-switched network 38 such as the Internet or a private packet network. Shown sitting as nodes on the packet-switched network (or accessible via the packet-switched network) are then an example call server 40 and an example latency management server 42.

With the arrangement shown, each WCD may engage in air interface communication with its serving BTS and, upon acquisition of a packet-data connection, may communicate with entities on the packet-switched network via the serving BTS, the serving RNC, the gateway, and the packet-switched network. For instance, provided with packet-data connectivity, each of the illustrated WCDs may engage in call setup signaling to establish a respective call leg with call server 40, and call server 40 may bridge the call legs together so as to allow users of the WCDs to communicate with each other.

Numerous variations from the arrangement shown in FIG. 1 are possible. For example, each BTS may define more or fewer wireless coverage areas than shown. As another example, a different number of WCDs may operate in any of the coverage areas at a given time. As yet another example, different network elements may be provided to serve the various wireless coverage areas and in the communication path between a given coverage area and the packet-switched network. And as yet another example, various entities shown can be distributed, combined, integrated or otherwise arranged, while still facilitating the basic functionality of the present method.

In example operation, air interface communication between each BTS and a served WCD may proceed according to any agreed air interface protocol, such as CDMA (e.g., IS-95, IS-2000, 1xRTT, 1xEV-DO, etc.), WiMAX, iDEN, TDMA, AMPS, GSM, GPRS, UMTS, EDGE, LTE, and others now known or later developed. Further, the protocol used for air interface communication may vary from coverage area to coverage area.

Each coverage area may also take various forms, and the coverage areas may differ in form from each other. By way of example, an example coverage area may be an entire cell defined by a BTS, a sector of such a cell. Or a coverage area could be defined as a combination of cells or cell sectors, defined by one or more BTSs. For instance, a coverage area could be defined as the combination of cells and/or cell sectors served by a given BTS, served by a given RNC, or served by a given gateway, or in some other manner.

In practice, when a WCD first powers on or moves into a coverage area, the WCD may detect a pilot signal broadcast from a BTS and may register for service in the coverage area. For instance, the WCD may transmit a registration message via an air interface access channel to the serving BTS, and the BTS may forward the registration message to other network infrastructure, such as to an RNC and a switch (not shown), which may signal with a home location register (HLR) to authenticate and register the WCD for service in the coverage area.

To acquire packet data connectivity so as to be able to engage in communication on packet-switched network 38, the WCD may similarly engage in signaling with the serving BTS and with other network infrastructure. Through that signaling, the network may assign radio link connection for use by the WCD to engage in packet-data communication over the air interface, and the network may assign a network address such as an IP address for use by the WCD to communicate on the packet-switched network.

As noted above, if no packet-data flows to or from such a WCD for a threshold period of time, the WCD may transition from an active state to a dormant state. In practice, for instance, the RNC serving the WCD may detect the absence of such packet-data flow for the threshold time and may responsively release the radio link connection that was assigned to the WCD, thus putting the WCD in a dormant mode. Since an IP address may still be reserved for the WCD at that point, however, the gateway 36 and serving RNC may receive packet-data destined to the WCD. When that happens, the RNC may then page the WCD over an air interface paging channel. Upon detecting the page message, the WCD may then transmit a response via an air interface traffic channel, and the RNC/BTS may then assign a radio link again for use by the WCD, thus transitioning the WCD from the dormant state to the active state. The RNC may then transmit the received packet-data to the WCD via the newly assigned radio link.

As further noted above, packet-based signaling can be used to set up a packet-based communication session between WCDs via a call server. In practice, for example, if a user of WCD A would like to set up a session with users of WCDs B, C, D, and E, the user of WCD A may select the target WCDs from a contact list on WCD A and may invoke a session initiation function (e.g., press a session initiation button). In response, WCD A may generate and transmit to call server 40 (via BTS 12, RNC 30, gateway 36, and network 38) a SIP INVITE message requesting setup of a session between WCD A and WCDs B, C, D, and E.

Upon receipt of SIP INVITE from WCD A, the call server may then send a SIP INVITE to WCD B (via network 38, gateway 36, RNC 30 and BTS 14), a SIP INVITE to WCD C (via network 38, gateway 36, RNC 32, and BTS 16), a SIP INVITE to WCD D (via network 38, gateway 36, RNC 34, and BTS 18), and a SIP INVITE to WCD E (also via network 38, gateway 36, RNC 34, and BTS 18). In the event any of these target WCDs is dormant when the SIP INVITE arrives at its serving network infrastructure (e.g., RNC), the network may then page the WCD to wake it up before being able to send the SIP INVITE over the air to the WCD.

As each target WCD receives its SIP INVITE, the target WCD may (with or without user interaction) respond with a SIP OK message to the call server. Upon receipt of OKs from the target WCDs, or with other timing, the call server may then send a SIP OK of its own to the initiating WCD A. After an exchange of additional signaling messages (e.g., SIP ACK messages), an RTP leg would thereby be established respectively between each WCD and the call server, and the call server may bridge those RTP legs together to allow the WCDs to communicate with each other, and thus to allow the users of the WCDs to communicate with each other.

According to the present method, a computer will track or determine the communication latency deemed to be associated with each of a plurality of coverage areas in the network and will use that latency data as a basis to predict measures of call setup signaling latency for WCDs that are positioned (e.g., last registered) in particular coverage areas. Based on the predicted measures of call setup signaling latency, the computer may then select one or more WCDs to wake up, and the computer may send one or more messages to trigger advanced wakeup of the selected WCD(s), so as to help mitigate the predicted signaling latency with respect to the selected WCD(s).

In practice, many of these functions may be carried out by the illustrated latency management server (LMS) 42. Alternatively, the computer can take other forms and can reside elsewhere. For example, functions of the computer can be integrated with or carried out by the call server 40, or one or more other network entities.

Figure 2:
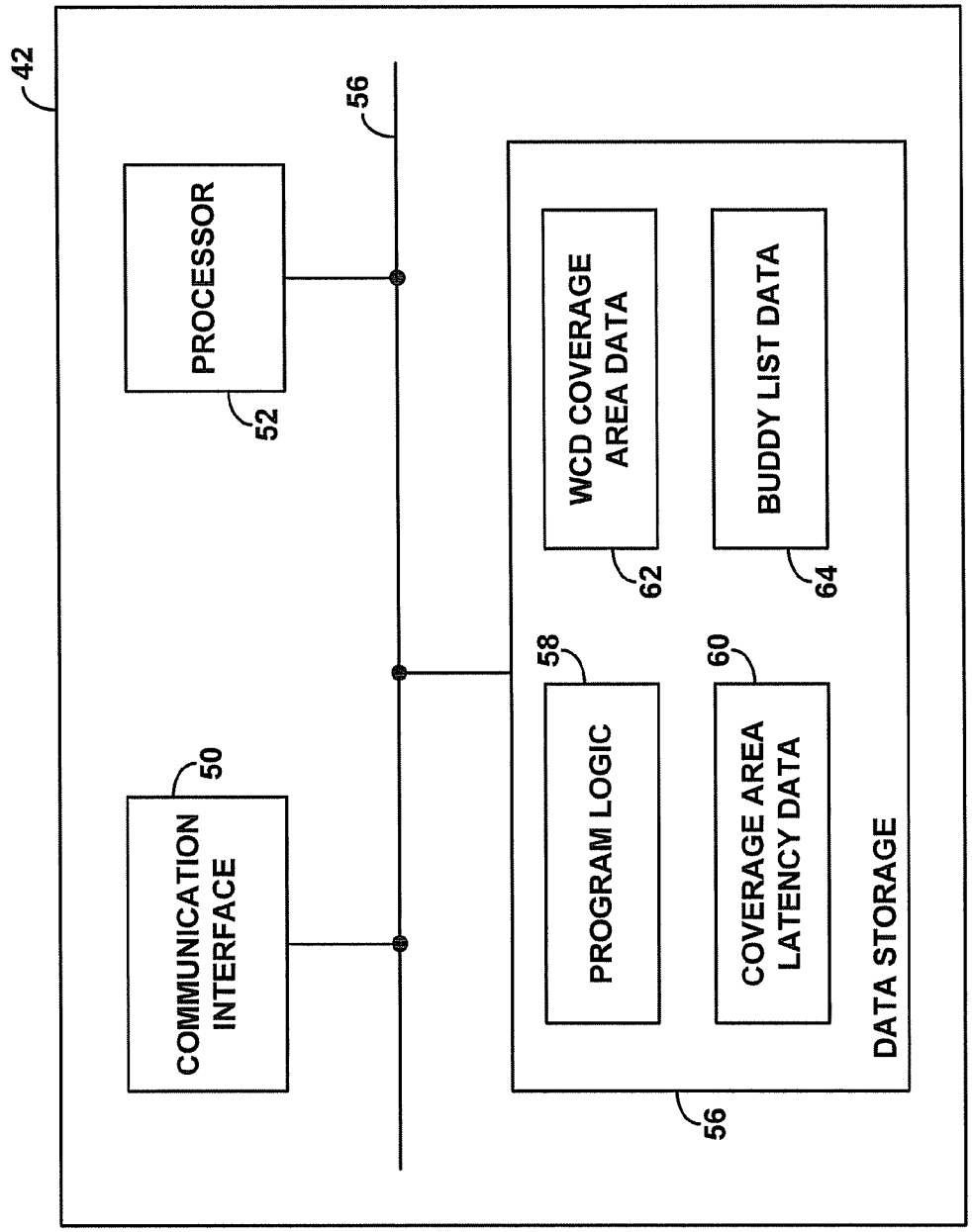
FIG. 2 is a simplified block diagram of a server arranged to carry out functions of the method.

FIG. 2 is a simplified block diagram showing some of the functional components of an example LMS 42 for use in carrying out the present method. As shown, the LMS includes a network communication interface 50, a processor 52, and data storage 54, all of which may be communicatively linked together by a system bus, network, or other mechanism 56.

Communication interface 50 provides for high speed communication on packet-switched network 38 and may include wireless and/or wired interface components, such as a wireless or wired Ethernet interface. When connected with network 38, communication interface 50 preferably acquires or has a fixed IP address that it uses for packet-switched communication with other entities on or via the network.

Processor 52 comprises one or more general purpose processors (e.g., INTEL microprocessors) and/or one or more special purpose processors (e.g., digital signal processors or application specific integrated circuits). If processor 52 includes multiple processors, the processors may work in parallel or in some other manner to achieve various LMS functions.

Data storage 54 in turn comprises one or more volatile and/or non-volatile storage components, such as magnetic, optical, electronic, organic, or other storage, and may be integrated in whole or in part with processor 52 or with one or more other components of the LMS. As shown, data storage contains or can contain program logic 58, coverage area latency data 60, WCD coverage area data 62, and buddy list data 64. Alternatively, LMS may externally access one or more of these data components, such as by querying or calling one or more other entities.

Program logic 58 comprises machine language instructions or other sort of program logic executable or interpretable by processor 52 to carry out various functions described in this document, such as identifying the coverage areas in which various WCDs are positioned (e.g., last registered), predicting a measure of call setup signaling latency per WCD based at least in part on the coverage area in which the WCD is positioned, selecting one or more WCDs based at least on the predicted measures of call setup signaling latency, and sending at least one message to trigger wakeup of each selected WCD. Provided with the present disclosure, one of ordinary skill in the art can write or otherwise develop code executable by the processor to cause the LMS to carry out the described functions.

Coverage area latency data 60 comprises data that correlates each of a plurality of coverage areas in the network with empirical data regarding communication latency associated with the coverage area. In particular, coverage area latency data 60 may indicate for each coverage area in the network a measure of latency for communications between the coverage area and the call server 40, so that the latency data can be used as a basis to predict call setup signaling latency from the call server to a given WCD. For each coverage area, this latency data can be established by one or more network entities comparing send and receive timestamps in communications passing along a communication path between the coverage area and the call server. The entities may then report the established latency data to the LMS.

By way of example, for each communication that passes from a given BTS to the call server, the BTS may insert a timestamp into the communication to indicate when the communication left the BTS, and the call server may record a timestamp to indicate when the call server receives the communication. By comparing the receive timestamp with the BTS send timestamp, the call server can determine how much time it took for the communication to pass from the BTS to the call server. Further, the call server may note the coverage area at issue by referring to a BTS identifier in the communication or by querying other data to correlate the communication with the coverage area. The call server may then average or otherwise statistically aggregate a plurality of such measurements for communications involving the a given coverage area and may record that average as a measure of latency for the coverage area, and the call server may send that average data to the LMS for storage as the correlation data for that coverage area. Alternatively, the call server may send the raw measurements per coverage area to the LMS, and the LMS may average or otherwise roll up the measurements and record them as the correlation data.

As another example, one or more RNCs may each include a processor that is programmed to evaluate communication latency for its coverage area generally, or respectively for each of a plurality of BTS coverage areas (e.g., cells, cell sectors, etc.) under its control. To do so, the RNC may similarly compare send and receive timestamps to evaluate latency respectively between a coverage area and the call server.

In particular, the RNC may separately evaluate latency for communications between the RNC and a BTS coverage areas under the RNC's control and latency for communications between the RNC and the call server, and the RNC may then combine those latency measures together to establish a latency measure between the BTS coverage area and the call server.

For instance, for each communication that the RNC receives from a BTS under its control, the RNC may compare the BTS send time (per a send timestamp) with RNC receive time in order to determine how long it took for the communication to pass from the BTS to the RNC. The RNC may then establish a rolling average of those BTS-to-RNC latency measures for each BTS coverage area under its control. Further, for each communication that the RNC receives from the call server, the RNC may determine that the communication is from the call server by reading a source address of the communication and determining that the source address is an address of the call server, and the RNC may similarly compare the call server send time with the RNC receive time in order to determine how long it took for the communication to pass from the call server to the RNC. And the RNC may establish a rolling average of those call-server-to-RNC latency measures. For each coverage area under its control, the RNC may then combine the BTS-to-RNC latency measure with the call-server-to-RNC latency measure, to establish an aggregate measure of latency for communications between the coverage area and the call server. The RNC may then report such latency measures to the LMS for storage as correlation data per coverage area.

Various entities such as the call server and/or the RNCs may be programmed to push this latency data to the LMS. For instance, the LMS may subscribe to receive the data from each such entity. Alternatively, the LMS may periodically query such entities to obtain the data. Still alternatively, the LMS may query the entities to obtain the data when the LMS has a need for the data, such as when the LMS seeks to determine the latency measure for a particular coverage area.

Further, while the above discussion focuses on latency in terms of timing for conveying communications between a BTS and the call server, the latency per coverage area can be defined in other ways, possibly including more or less information. For instance, the latency for a particular coverage area could additionally take into account latency for communications over the air in the coverage area, such as by comparing WCD send time (per send timestamp) with receive time at a network entity such as the BTS, RNC or call server. Further, other entities could establish and provide latency measures. For instance, WCDs themselves could be programmed to evaluate communication latency for communications on a per coverage area basis and to report the established latency measures to the LMS or to one or more other entities for reporting in turn to the LMS.

Still further, the latency data could be established on a time of day (e.g., time, day, date, etc.) basis, to account for possibly regular variations in latency over time. For instance, the communication latency associated with a particular coverage area may be particularly high at certain times of the day. By separately establishing latency measures on a per time basis and providing that data to the LMS, the LMS can beneficially maintain and refer to coverage area latency data corresponding with the current time of day. For example, the coverage area latency data 60 may specify that a given coverage area has a particular latency at certain times of day but that the given coverage area has another latency at other times of day. When the LMS references the coverage area latency data for that coverage area, the LMS may then refer to the data corresponding with the current time of day. Other variations and enhancements in establishing and maintaining coverage area latency data 60 may be possible as well.

WCD coverage area data 62, in turn, comprises data that specifies for each of a plurality of WCDs the coverage area in which the WCD is deemed to be "positioned." The coverage area where a WCD is deemed to be positioned may be the coverage area where the WCD is actually currently located and operating, or it may simply be the coverage area in which the WCD last registered (even though the WCD may have moved to another coverage area since last registering).

The WCD coverage area data may be provided to the LMS by one or more HLRs, RNCs or other network entities. For instance, an HLR may include a processor programmed with logic to respond to WCD registration in a coverage area by reporting to the LMS that the WCD is positioned in the coverage area, and the LMS may record that indication in the WCD coverage area data. Alternatively, an RNC or the call server may include a processor programmed with logic to report to the LMS that a WCD is positioned in a given coverage area, as determined by reading BTS identification information in communications received from the WCD. Further, the LMS may regularly obtain this information about WCD coverage areas, or the LMS may query for the information on an as needed basis, such as when the LMS is seeking to identify the coverage area in which a particular WCD is positioned.

WCD buddy data 64 comprises data that specifies, per WCD (e.g., per WCD user) one or more buddy WCDs. This data may be the same group data that is used by the call server to facilitate setup of group communication sessions when requested by the WCD. As such, the data may be replicated in the call server and the LMS, or the data may be stored in a manner that is accessible by both the call server and the LMS. The data may be updated through a web interface, through automated over the air synchronization with contact list changes on the WCD, or in some other manner.

The present method may be carried out by the LMS or other entity in response to various method triggers, so as to perform advanced wakeup of select buddies of a given WCD (or to perform advanced wakeup of certain WCDs selected from of any designated group of WCDs). For example, the method may be carried out periodically (such as hourly or at some other interval) for the WCD. As another example, the method may be carried out at a time of day when the WCD tends to initiate communication sessions, as determined by analysis of past session initiation data. As yet another example, the method may be carried out when the WCD first powers on, when the WCD newly registers in a coverage area, when the WCD acquires packet data connectivity, or at other times. Further, the method may be carried out concurrently for a plurality of WCDs.

Figure 3:
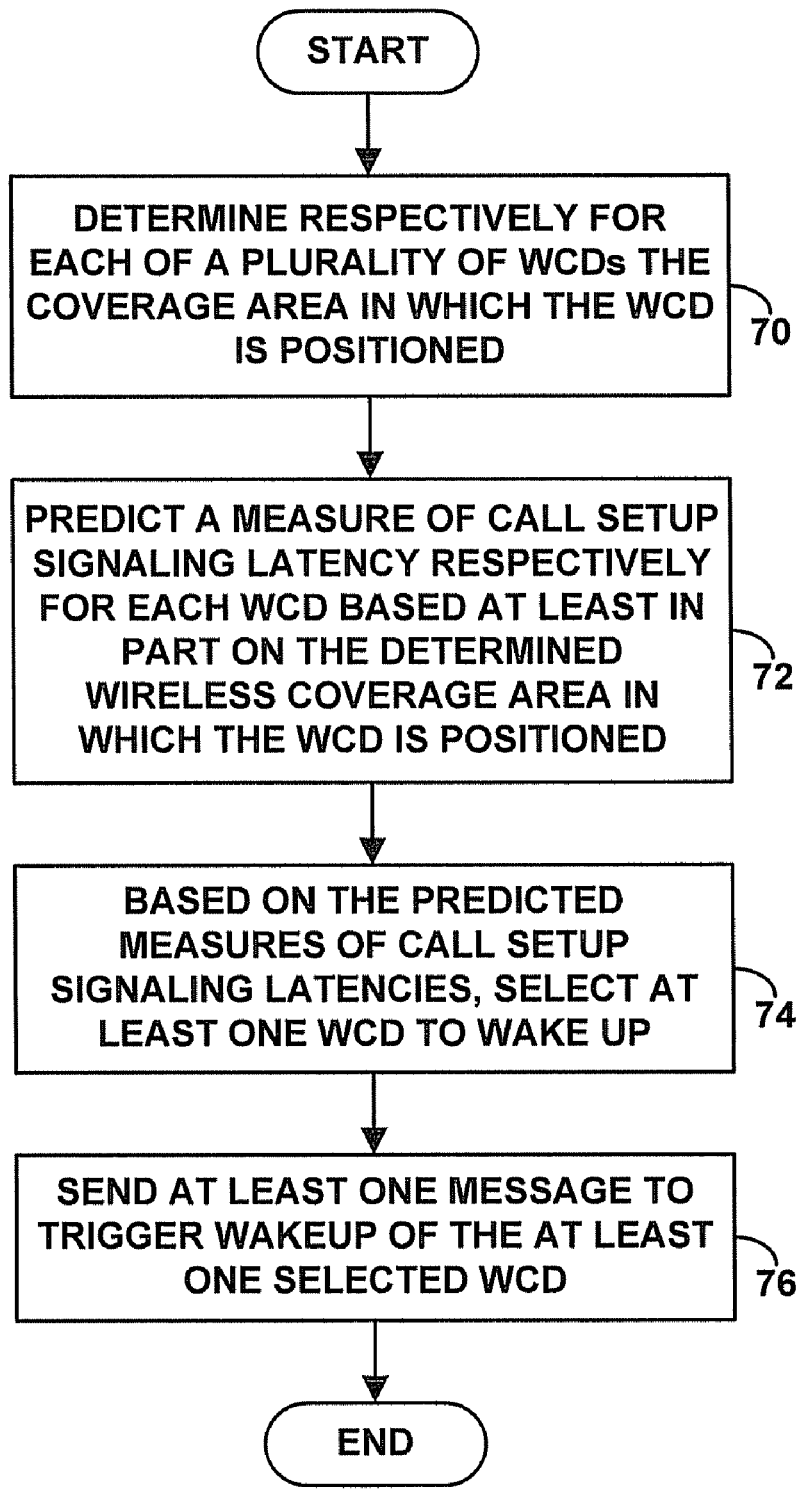
FIG. 3 is a flow chart depicting functions that can be carried out in accordance with the method.

FIG. 3 is next a flow chart depicting functions that can be carried out in accordance with the present method, in the example arrangement of FIG. 1 for instance. The method can be carried out by a server (i.e., any programmed computer) such as LMS 42 for instance and is assumed to be carried out with respect to a group of WCDs so as to determine which if any of the WCDs to should be awakened in advance, to help reduce call setup latency. For instance, the method may be carried out with respect to the buddies of a given WCD, in which case the server may determine the buddies at issue by querying WCD buddy data 64.

As shown in FIG. 3, at step 70, the server determines for each WCD at issue the coverage area in which the WCD is positioned. To do this, the server may simply query WCD coverage area data 62. Alternatively, as noted above, the server may query one or more other entities such as an HLR for instance, to determine each WCD's coverage area of last registration. In practice, the act of determining the coverage area in which a WCD is positioned may thus comprise receiving a message that indicates the coverage area in which the WCD is positioned, whether the message is received in response to a query or automated push from another entity, and regardless of whether the message is sent on an as-needed basis or otherwise.

At step 72, the server then predicts a measure of call setup signaling latency respectively for each WCD based at least in part on the determined wireless coverage area in which the WCD is positioned.

To do this in practice, the server may determine a measure of latency between the call server 40 and the WCD's coverage area, by reading coverage area latency data 60 or by querying one or more entities to obtain the latency information (e.g., based on a comparison of timestamps in call setup signaling or other communications passing between the calls server and the WCD's coverage area). This latency measure may be considered a target leg latency from the perspective of potentially inviting the WCD to participate in a session. The server may then predict the measure of call setup signaling latency for the WCD based on the determined target leg latency for the WCD. For instance, the server may use the determined target leg latency as the predicted measure of call setup signaling latency for the WCD.

Alternatively or additionally, the act of predicting the measure of call setup signaling latency for the WCD may involve considering a combination of both source leg latency and target leg latency. This can be relevant in a scenario where the method is applied to select one or more buddies of a particular WCD to be awakened in advance of the WCD initiating a session with the buddies. For instance, this may apply in FIG. 1 with respect to WCD A, considering WCDs B, C, D, and E to be the buddies, and the issue my be which if any of WCD A's buddies should be awakened in advance of WCD A initiating a session with the buddies (e.g., before a user of WCD A requests session initiation).

In this example scenario, the server may determine a source leg latency for WCD A, for instance by reading coverage area latency data 60 or by querying one or more entities to obtain the latency information for coverage area 20, the coverage area where WCD A is currently positioned (e.g., based on a comparison of timestamps in call setup signaling or other communications passing between the call server and coverage area 20). For each of the buddy WCDs B, C, D, and E, the server may then determine a respective target leg latency, for instance by reading coverage area latency data 60 or by querying one or more entities to obtain the latency information for the WCDs' respective coverage areas 22, 24, 26, 28. For each buddy WCD, the server may then compute a sum of source leg latency (determined for WCD A) and target leg latency (determined for the buddy WCD). The server may then predict the measure of call setup signaling latency for the buddy WCD based at least in part on that sum. For instance, the server may consider the predicted measure of call setup signaling latency to be that sum.

As noted above, the act of determining latency for a given wireless coverage area may involve one or more RNCs determining the latency by summing (i) a latency between the RNC and a base station for the given coverage area and (ii) a latency between the RNC and the call server. An RNC that determines the latency for a coverage area may then report the determined latency to the server that carries out one or more of the functions of FIG. 3 (e.g., by reporting the end result data or by reporting the raw underlying data to be aggregated or otherwise analyzed by the recipient server).

At step 74, after the server has predicted the measure of call setup latency respectively for each WCD based at least in part on the determined coverage area in which the WCD is positioned, the server then selects at least one of the WCDs to wake up based on the predicted measures of call setup signaling latencies. As noted above, the server may do this by ranking the WCDs in order of predicted call setup signaling latencies and selecting at least one of the top ranked WCDs in accordance with the ranking. For instance, the server may select the WCD with the highest predicted call setup signaling latency, or the server may select the two WCDs having the two highest predicted call setup signaling latencies or some other of the top ranked WCDs. Alternatively, for that matter, there may be some reason that the server would select the bottom ranked WCD or WCDs to wake up or in some other manner select one or more WCDs based on the ranking.

Alternatively, the server may select the at least one WCD to wakeup by conducting a threshold analysis with respect to each WCD. For instance, the server may select as a WCD to wake up any WCD whose predicted measure of call setup latency exceeds a particular threshold level of latency, where the particular threshold may be predefined or may be dynamically defined based on or more factors. In this implementation of the method and indeed in any implementation of the method, preferably at least one WCD will be selected to be awakened.

At step 76, the server then sends at least one message to trigger wakeup of the at least one selected WCD. As noted above, for instance, the server may send a PING message or other packet-data to each selected WCD, to cause the radio network serving the WCD to wake up the WCD if the WCD is dormant. If the server has only a SIP address or other address of the selected WCD and the address needs to be translated for routing to the IP address of the selected WCD, the server may query mapping data to perform the conversion itself, or the server may send the message to cause some other entity to do the necessary translation and ultimately effect transmission of the message to the selected WCD.

The at least one message sent by the server can be destined to the one or more selected WCDs and/or destined to one or more other entities that would directly or indirectly cause the selected WCDs to be awakened. For instance, the server can send a message to a RNC specifically directing the RNC to wake up a selected WCD, and the RNC may do so in response.

According to another aspect of the present method, the method may involve sending a notification to a given WCD notifying the WCD of the predicted measures of call setup signaling latency for each buddy WCD, to facilitate presentation of the buddy latency data to a user of the given WCD. For instance, once the server has predicted the measures of call setup latency for each of WCD A's buddies (WCDs B, C, D, and E), the server may transmit to WCD A one or more presence update messages that specify the predicted measures of call setup latency for the buddies. The presence update messages may be SIP NOTIFY messages for instance or may take some other form. WCD A may then programmatically present to a user (e.g., in a displayed buddy list) an indication of the expected latency of each buddy WCD, in the form of a numerical representation of latency value or general level (e.g., low, medium, high, etc.) The user of WCD A can then advantageously use the presented latency information as a basis to select which WCDs the user would like to select as targets for a new session. This notification process may be carried out in conjunction with the advanced wakeup process or as a separate function but advantageously leverages the above-discussed functions of predicting measures of call setup signaling latency.

An exemplary embodiment has been described above. Those of ordinary skill in the art will appreciate, however, that numerous changes to the embodiment described can be made without deviating from the basic principles of the invention.

We claim:

1. A method for latency-based management of device-wakeup comprising:
determining a source leg latency between at least a call server and a given wireless coverage in which a given wireless communication device (WCD) is positioned;
for each of a plurality of WCDs that are buddies of the given WCD, (i) a server determining in which of a plurality of wireless coverage areas the WCD is positioned, (ii) determining a target leg latency between at least the call server and the wireless coverage area in which the WCD is positioned, and (iii) the server predicting a measure of call setup signaling latency for the WCD based at least in part on the determined wireless coverage area in which the WCD is positioned, wherein predicting the measure of call setup signaling latency for the WCD based at least in part on the determined wireless coverage area in which the WCD is positioned comprises predicting the measure of call setup latency by at least summing the determined source leg latency and the determined target leg latency,
based on the predicted measures of latencies, the server selecting at least one of the WCDs to wake up, wherein selecting at least one of the WCDs to wake up based on the predicted measures of latencies comprises: for each WCD of the plurality, (a) making a determination of whether the predicted measure of latency is at least a threshold level of latency, and (ii) selecting the WCD to wake up if the determination is that the predicted measure of latency is at least the threshold level of latency, wherein the determination for at least one of the WCDs of the plurality is that the predicted measure of latency is at least the threshold level of latency; and
the server sending at least one message to trigger wakeup of the at least one selected WCD.

2. The method of claim 1,
wherein determining in which of the plurality of wireless coverage areas the WCD is positioned comprises receiving a message indicating the wireless coverage area in which the WCD is positioned.

3. The method of claim 2, wherein the message is provided in response to registration of the WCD in the wireless coverage area in which the WCD is positioned.

4. The method of claim 1, wherein selecting the at least one WCD to wake up based on the predicted measures of latencies comprises:
ranking the predicted measures of latencies of the WCDs and selecting the at least one based on the ranking.

5. The method of claim 4, wherein selecting the at least one WCD based on the ranking comprises selecting one or more WCDs ranked highest in the ranking.

6. The method of claim 1, wherein determining the target leg latency between at least the call server and the wireless coverage area in which the WCD is positioned comprises determining the target leg latency based at least on a comparison of timestamps in communications between the call server and a wireless coverage area serving node.

7. The method of claim 1,
wherein determining the target leg latency between at least the call server and the wireless coverage area in which the WCD is positioned comprises determining the target leg latency based at least on comparing timestamps in call setup signaling passing between the call server and a node of the wireless coverage area in which the WCD is positioned, and
wherein determining the source leg latency between at least the given wireless coverage area and the call server comprises determining the source leg latency based at least on comparing timestamps in call setup signaling passing between a node of the given wireless coverage area and the call server.

8. The method of claim 1,
wherein determining the target leg latency between at least the call server and the wireless coverage area in which the WCD is positioned comprises a radio network controller for the wireless coverage area in which the WCD is positioned determining the target leg latency as at least a sum of (i) a latency between the radio network controller and a base station for the wireless coverage area in which the WCD is positioned and (ii) a latency between the radio network controller and the call server.

9. The method of claim 8, further comprising reporting the determined target leg latency from the radio network controller to the server.

10. The method of claim 1,
wherein determining the source leg latency between at least the given wireless coverage area and the call sever comprises a radio network controller for the given wireless coverage area determining the source leg latency as at least a sum of (i) a latency between the radio network controller and a base station for the given wireless coverage area and (ii) a latency between the radio network controller and the call server.

11. The method of claim 10, further comprising reporting the determined target leg latency from the radio network controller to the server.

12. The method of claim 1, further comprising:
sending to the given WCD a notification of the predicted measure of latency respectively for each of the other WCDs, to facilitate presentation of buddy latency information to a user of the given WCD.

13. The method of claim 1, wherein sending at least one message to trigger wakeup of the at least one selected WCD comprises sending a PING message to each of the at least one selected WCD.

14. The method of claim 1, further comprising:
limiting the method to application for WCDs that are currently dormant.

15. A system comprising a network communication interface, one or more processors, data storage, and program logic stored in the data storage and executable by the one or more processors to carry out functions including:
determining a source leg latency between at least a call server and a given wireless coverage in which a given wireless communication device (WCD) is positioned;
for each of a plurality of WCDs that are buddies of the given WCD, (i) determining in which of a plurality of wireless coverage areas the WCD is positioned, (ii) determining a target leg latency between at least the call server and the wireless coverage area in which the WCD is positioned, and (iii) predicting a measure of call setup signaling latency for the WCD based at least in part on the determined wireless coverage area in which the WCD is positioned, wherein predicting the measure of call setup signaling latency for the WCD based at least in part on the determined wireless coverage area in which the WCD is positioned comprises predicting the measure of call setup latency by at least summing the determined source leg latency and the determined target leg latency,
based on the predicted measures of latencies, selecting at least one of the WCDs to wake up, wherein selecting at least one of the WCDs to wake up based on the predicted measures of latencies comprises: for each WCD of the plurality, (a) making a determination of whether the predicted measure of latency is at least a threshold level of latency, and (ii) selecting the WCD to wake up if the determination is that the predicted measure of latency is at least the threshold level of latency, wherein the determination for at least one of the WCDs of the plurality is that the predicted measure of latency is at least the threshold level of latency; and
sending at least one message to trigger wakeup of the at least one selected WCD.

16. A method for providing latency notification comprising:
determining a source leg latency between at least a call server and a given wireless coverage in which a given wireless communication device (WCD) is positioned, wherein determining the source leg latency between at least the call server and the given wireless coverage area comprises a radio network controller for the given wireless coverage area determining the source leg latency as at least a sum of (i) a latency between the radio network controller and a base station for the given wireless coverage area and (ii) a latency between the radio network controller and the call server;
for each of a plurality of WCDs that are buddies of the given WCD, a server (i) determining in which of a plurality of wireless coverage areas the WCD is positioned, (ii) determining a target leg latency between at least the call server and the wireless coverage area in which the WCD is positioned, and (iii) predicting a measure of call setup signaling latency for the WCD based at least in part on the determined wireless coverage area in which the WCD is positioned, wherein predicting the measure of call setup signaling latency for the WCD based at least in part on the determined wireless coverage area in which the WCD is positioned comprises predicting the measure of call setup latency by at least summing the determined source leg latency and the determined target leg latency; and
the server sending to the given WCD a notification of the predicted measures of latency respectively for each of the WCDs of the plurality, to facilitate presentation of latency information to a user of the given WCD.

* * * * *